United States Patent
Alles

(10) Patent No.: US 11,707,743 B2
(45) Date of Patent: Jul. 25, 2023

(54) DEVICE FOR COMMINUTING LOOSE FEED MATERIAL

(71) Applicant: Siempelkamp Maschinen- und Anlagenbau GmbH, Krefeld (DE)

(72) Inventor: Berthold Alles, St. Wendel (DE)

(73) Assignee: Siempelkamp Maschinen- und Anlangbau GmbH, Krefeld (DE)

( * ) Notice: Subject to any disclaimer, the term of this patent is extended or adjusted under 35 U.S.C. 154(b) by 282 days.

(21) Appl. No.: 17/072,914

(22) Filed: Oct. 16, 2020

(65) Prior Publication Data
US 2021/0114037 A1  Apr. 22, 2021

(30) Foreign Application Priority Data

Oct. 16, 2019 (DE) .................. 10 2019 127 893.7

(51) Int. Cl.
*B02C 7/00* (2006.01)
*B02C 7/17* (2006.01)
*B02C 7/06* (2006.01)
*B02C 23/26* (2006.01)

(52) U.S. Cl.
CPC .................. *B02C 7/17* (2013.01); *B02C 7/06* (2013.01); *B02C 23/26* (2013.01)

(58) Field of Classification Search
CPC ............. B02C 7/06; B02C 7/17; B02C 23/26
See application file for complete search history.

(56) References Cited

U.S. PATENT DOCUMENTS

| 7,364,100 B2 * | 4/2008 | Pallmann | B02C 7/17 |
| | | | 241/66 |
| 7,510,133 B2 | 3/2009 | Pallmann | |
| 8,714,469 B2 | 5/2014 | Pallmann | |
| 9,468,929 B2 * | 10/2016 | Lefas | B02C 7/02 |
| 2019/0280984 A1 | 9/2019 | Elmdahl et al. | |

FOREIGN PATENT DOCUMENTS

| DE | 10 2004 050 003 A1 | 4/2006 |
| DE | 10 2010 049 485 A1 | 5/2012 |

* cited by examiner

*Primary Examiner* — Faye Francis
(74) *Attorney, Agent, or Firm* — Muncy, Geissler, Olds & Lowe, P.C.

(57) ABSTRACT

A device for comminuting feed material with first comminuting tools and second comminuting tools, which are arranged inside a housing coaxially to an axis and which are axially spaced apart to form a comminuting zone, and of which at least the first comminuting tools perform a rotational movement about the axis. In a contact area between a first tool carrier and the first comminuting tools and/or in a contact area between a second tool carrier and the second comminuting tools a plurality of channels for the passage of a process gas are provided. The channels each have a radially inner inlet opening through which the process gas enters the channels and a radially outer outlet opening through which the process gas emerges from the channels. Among other things, this achieves improved cooling of the comminuting zone.

15 Claims, 3 Drawing Sheets

DEVICE FOR COMMINUTING LOOSE FEED MATERIAL

This nonprovisional application claims priority under 35 U.S.C. § 119(a) to German Patent Application No. 10 2019 127 893.7, which was filed in Germany on Oct. 16, 2019, and which is herein incorporated by reference.

BACKGROUND OF THE INVENTION

Field of the Invention

The present invention relates to a device for the comminuting of loose feed material.

Description of the Background Art

Comminuting devices are characterized by an air-flow operating mode, in which air, together with the feed material, is introduced as a gas/solid mixture axially into the comminuting chamber and, after radial deflection due to centrifugal force, passes into an annular grinding gap formed by comminuting tools. After comminuting there to the desired size, the sufficiently fined material is radially discharged from the grinding gap and collects in an annular channel circulating between the housing and the comminuting tools, from where it is tangentially discharged from the device in the air flow.

The comminuting energy to be applied is converted to heat to a considerable extent. The reasons for this are frictional, shear and impact forces to which the feed material is subjected in the course of the comminuting and which occur primarily in the area of the comminuting tools. In the case of heat-resistant feed material, the air flow inherent to generic devices is sufficient to cool the comminuting tools to such an extent that the material to be ground is not adversely affected.

Problems arise regularly when heat-sensitive feed material is to be shredded. In particular when shredding plastics with a low softening point, operators of generic devices face a difficult task. On the one hand, the feed material should be milled just below the softening point in order to achieve the highest possible machine performance. However, if the material-dependent limit temperature is exceeded, there is a softening and melting of the feed material, with the result that individual particles agglomerate and the grain size and grain size distribution of the final product no longer lie in the desired range. On the other hand, particles that have been heated above the limit temperature stick to machine parts and in particular to comminuting tools so that both the machine performance and the quality of the end product suffer.

This problem is reinforced in fine and ultra-fine milling of heat-sensitive materials, because it has been shown that the finer the end product to be manufactured, the more comminuting has to be done and the greater the heat development in the area of the comminuting tools.

In order to avoid thermal overloading of the feed material during its comminution, a known measure consists in reducing the machine performance of comminuting devices. This means that less comminuting is done per unit of time and thus less excess heat is produced. However, it must be taken into account that the comminuting device is not fully utilized, which contradicts the basic requirement for economical operation of such devices.

To solve this issue, it is proposed in DE 10 2010 049 485 A1, which corresponds to U.S. Pat. No. 8,714,469, which is incorporated herein by reference, to conduct additional cooling air into the comminuting chamber via openings in the housing so as to cool the device and the milled material. By appropriately guiding the cooling air inside the device, efficient cooling of the comminuting zone is achieved without impairing machine performance.

SUMMARY OF THE INVENTION

It is therefore an object of the present invention to further improve known comminuting devices with regard to the cooling of the comminuting zone.

In an exemplary embodiment, a process gas is fed directly to the comminuting tools independently of the material flow. If the process gas is used to cool the comminuting tools, the direct contact of the process gas with the comminuting tools counteracts excessive heat generation in this area extremely efficiently. Since the process gas is conducted independently of the material flow, it is possible to control the effect of the process gas by regulating the amount of process gas per unit of time, without changing the gas/solid mixture in the feed to the comminuting zone. In this way, the invention opens up the possibility of further optimizing the comminuting operation. Thanks to the invention, it is possible to utilize the device according to the invention to capacity and, by supplying a suitable amount of process gas, to not exceed the material-dependent limit temperature. This results in considerable economic advantages for the operator of the device according to the invention.

The process gas and the material flow are preferably brought together downstream of the comminuting zone, with the process gas and material flow mixing together. If the process gas is an inert gas, the risk of explosion is thus reduced. By using a conditioned gas, for example conditioned air, the temperature and moisture content of the final product can be influenced. If suitable substances are added to the process gas, then color, smell, shelf life, processability and the like can be changed.

The process gas can enter the annular space, which surrounds the comminuting zone of an inventive device, at the end of the channels through radially aligned outlet openings. In contrast it is preferred, however, to deflect the channels, which initially run radially from the inside to the outside, in an axial direction in the end region so that the outlet openings are oriented axially. The process gas exiting the outlet openings in the axial direction thereby crosses the material flow radially exiting the comminuting zone. The turbulence which occurs in this case contributes to an intense heat exchange between material flow and process gas and also provides additional comminuting, which counteracts unwanted agglomeration formation.

The geometry of the channels can be chosen such that the flow rate of the process gas is high enough to dissipate excess heat. At the same time, however, it is necessary for the contact time to be sufficiently long so as to not impair the heat transfer from the comminuting tools to the process gas flow.

To intensify the effect of the process gas on the comminuting tools and on the feed material, a further development of the invention provides for additional process gas to be conducted into the annular space between the housing casing and the comminuting tools. For this purpose, for example, one or more inlets, which open into the annular space and can be pressurized with process gas, can be arranged on the housing casing, the housing rear wall or the housing front wall. Two or more inlets are preferably provided, wherein at least one inlet opens into the upper annular space section situated above a horizontal dividing plane through the axis of rotation, and at least one inlet opens into the lower annular space section situated below the dividing plane.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
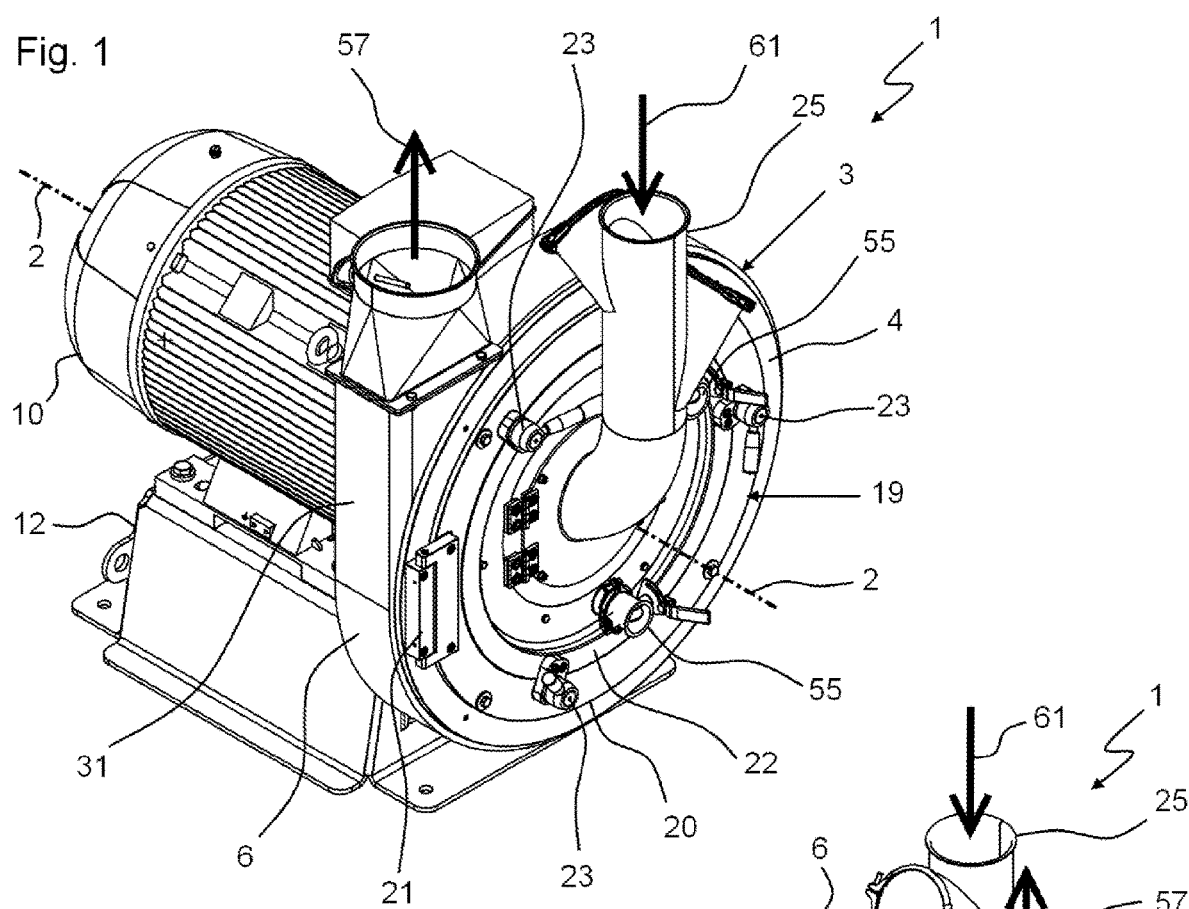
FIG. 1 is an oblique view of the front of a device according to the invention.
Figure 2:
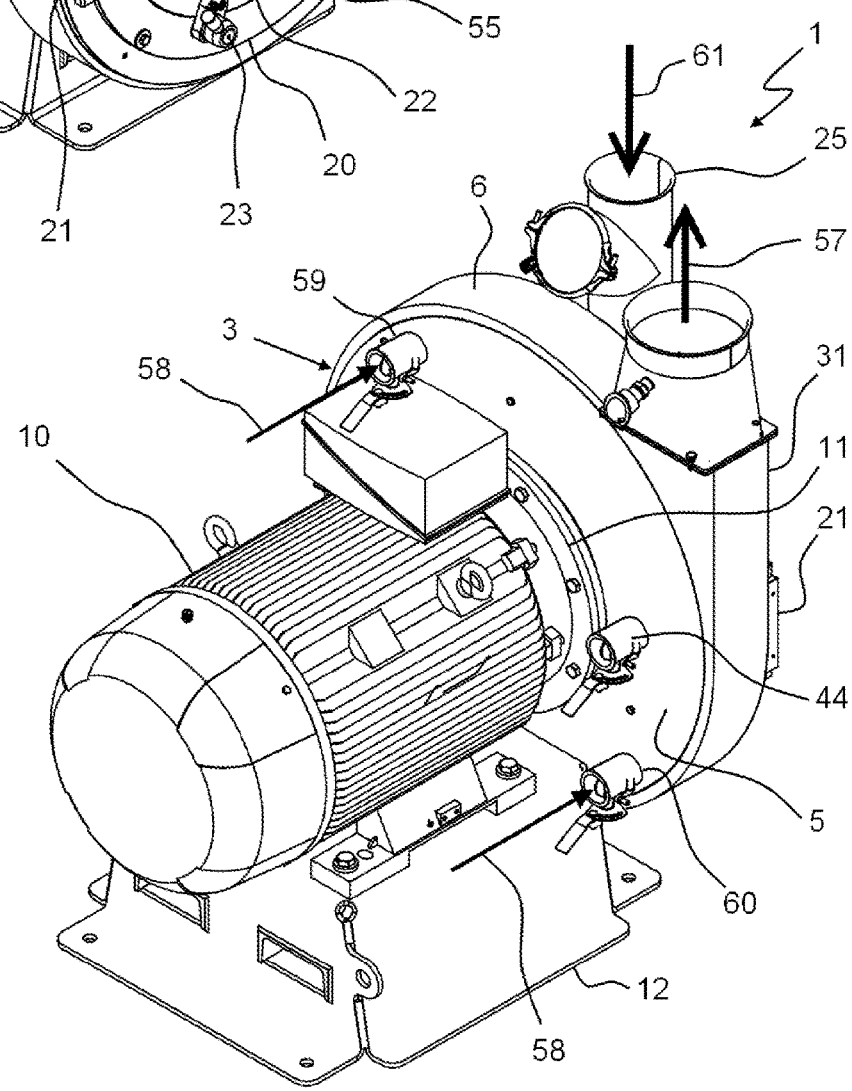
FIG. 2 is an oblique view of the rear of the device shown in FIG. 1.
Figure 3:
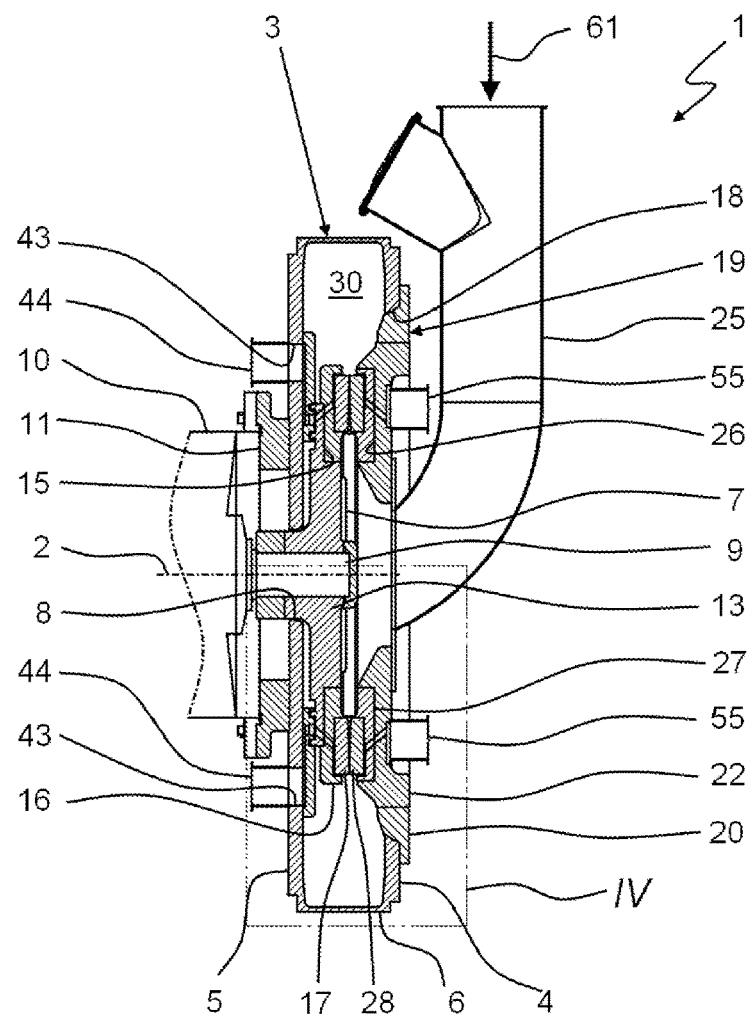
FIG. 3 shows a vertical section through the device shown in FIGS. 1 and 2.

FIGS. 1 to 3 show the basic structure of a device according to the invention in the form of a disk mill 1. The disk mill 1 has a substantially drum-shaped housing 3 surrounding an axis 2, with a front wall 4, a rear wall 5 axially spaced therefrom and a housing casing 6 connecting front wall 4 and rear wall 5, which together surround a comminuting chamber 7.

In the area of the axis 2, the rear wall 5 has a housing opening 8 which is coaxial with the axis 2 and through which the end of a drive shaft 9 of a drive unit extends. In the present embodiment, the drive shaft 9 is directly formed by the rotor shaft of an electric motor 10, but can also be driven as an independent shaft indirectly by a belt drive or another type of gearbox. The housing 3 is rigidly connected to the electric motor 10, which in turn rests on a stationary substructure 12, via an annular flange 11 that runs concentrically around the housing opening 8.

Figure 4:
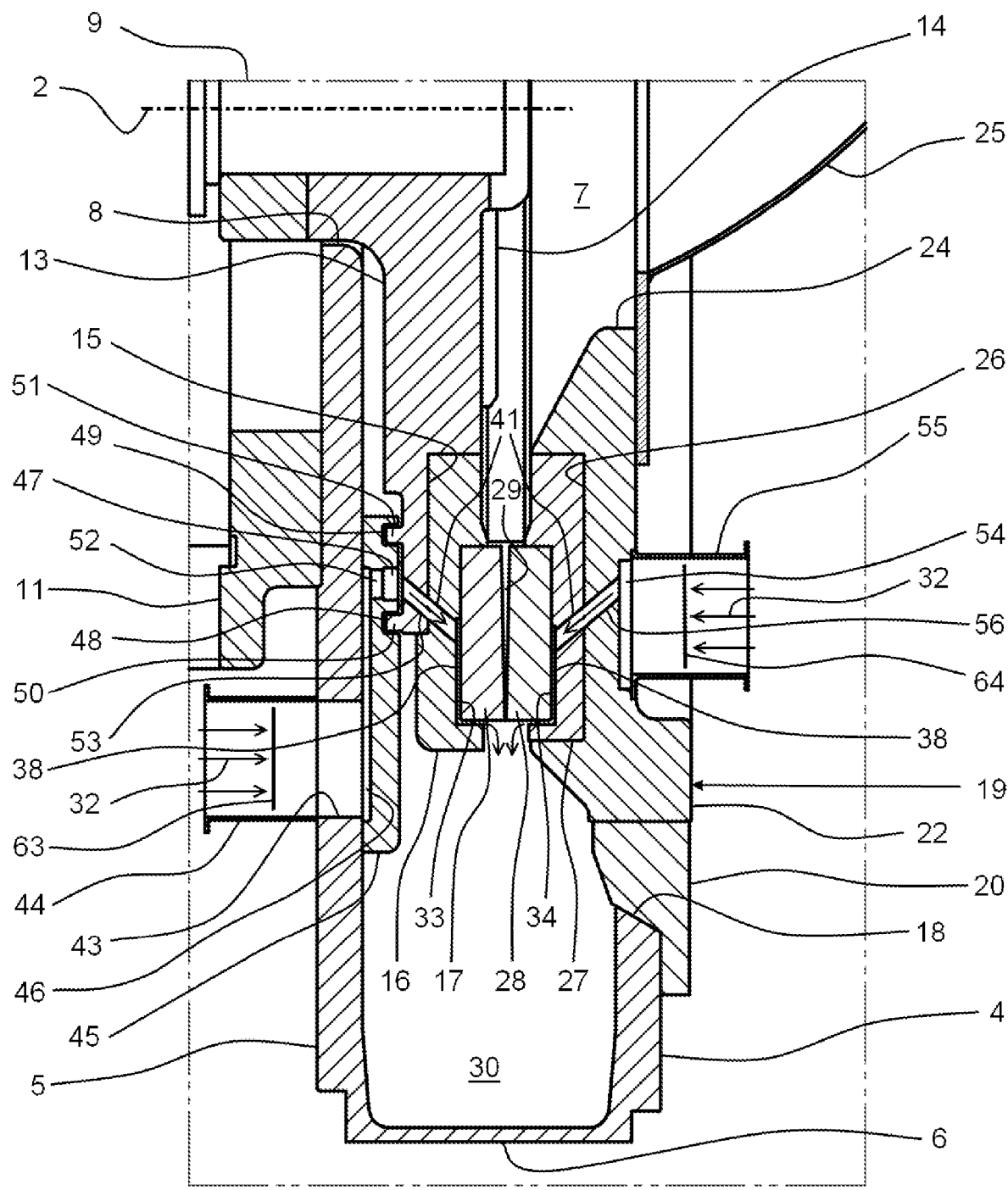
FIG. 4 is a partial cross-section of the area marked IV in FIG. 3 on a larger scale.

As can be seen particularly in FIG. 4, a circular rotor disk 13 with feed bars 14, which run radially to the axis 2 and are mounted in the area near the axis on the inner side facing the comminuting chamber 7, is rotatably fixed on a portion of the drive shaft 9 located within the housing 3. In the area of its outer circumference, the rotor disk 13 has on its inner side a recess 15 which coaxially encircles the axis 2 for receiving an annular first tool carrier 16. Via a portion of its reverse side facing the rotor disk 13, the first tool carrier 16 positively engages in the recess 15. Its opposite front side has an annular groove 33 which coaxially encircles the axis 2 and in which first comminuting tools 17 are arranged. The rotor disk 13 and the first tool carrier 16 can also be formed in one piece, reducing the assembly effort and assembly tolerances.

As shown in particular in FIGS. 1 and 3, the housing 3 has at its front wall 4 a further annular housing opening 18 that is concentric to the axis 2, which can be closed via a pivotable housing door 19. The housing door 19 comprises an annular door frame 20 which is articulated on the housing 3 about a vertical axis via a hinge 21. The door frame 20 receives an annular stator disk 22 in an axially displaceable manner, the door frame 8 with its inner periphery forming a slide bearing for the outer periphery of the stator disk 22. The relative position of the stator disk 22 relative to the door frame 20 can be adjusted and locked by three adjusting spindles 23.

The stator disk 22 has at its center a feed opening 24 that is coaxial with the axis 2, to which on the outside of the housing a vertical feed inlet 25 is connected via a round arch. Inwardly, the feed opening 24 widens over the thickness of the stator disk 22 in a funnel shape. The inner side of the stator disk 22 facing the comminuting chamber 4 has a groove-shaped recess 26 coaxially encircling an axis 2, which is intended to receive an also coaxially extending annular second tool carrier 27. The inner side of the second tool carrier 27 facing the comminuting chamber 7 in turn has an annular groove 34 that coaxially encircles the axis 2 and in which the second comminuting tools 28 are arranged. Like the rotor disk 13 and the first tool carrier 16, the stator disk 22 and the second tool carrier 27 can be designed in one piece.

In this way, the inner sides of the first comminuting tools 17 and second comminuting tools 28, which are effective during comminuting, axially oppose each other, thereby forming a comminuting zone 29 in the shape of an annular gap.

The disk mill 1 is charged with feed material 61 via the material inlet 25, which directs it centrally and axially into the comminuting chamber 7 via the feed opening 24. There it meets the inside of the rotor disk 13, where it is deflected in a radial direction and accelerated by the feed bars 14 towards the comminuting zone 29. The comminuting is carried out in the interaction of the rotating first comminuting tools 17 with the stationary second comminuting tools 28, which experience considerable heating in the process. After their comminution, the material particles radially enter an annular space 30 between the housing casing 6 and the rotor disk 13, where they are conducted in the air flow to a material outlet 31 tangentially emerging from the housing 3 and are withdrawn from the disk mill 1 as the end product 57.

The disk mill 1 is also equipped with a device for supplying a process gas 32 to the comminuting tools 17 and the comminuting tools 28, which is explained in more detail below, in particular with reference to FIGS. 4 and 5. In the present exemplary embodiment, cooling air is supplied as process gas 32 so as to counteract excessive heating of the comminuting tools 17, 28. This is achieved in that the process gas 32 is conducted directly along the rear sides of the first comminuting tools 17 and the second comminuting tools 28.

Figure 5:
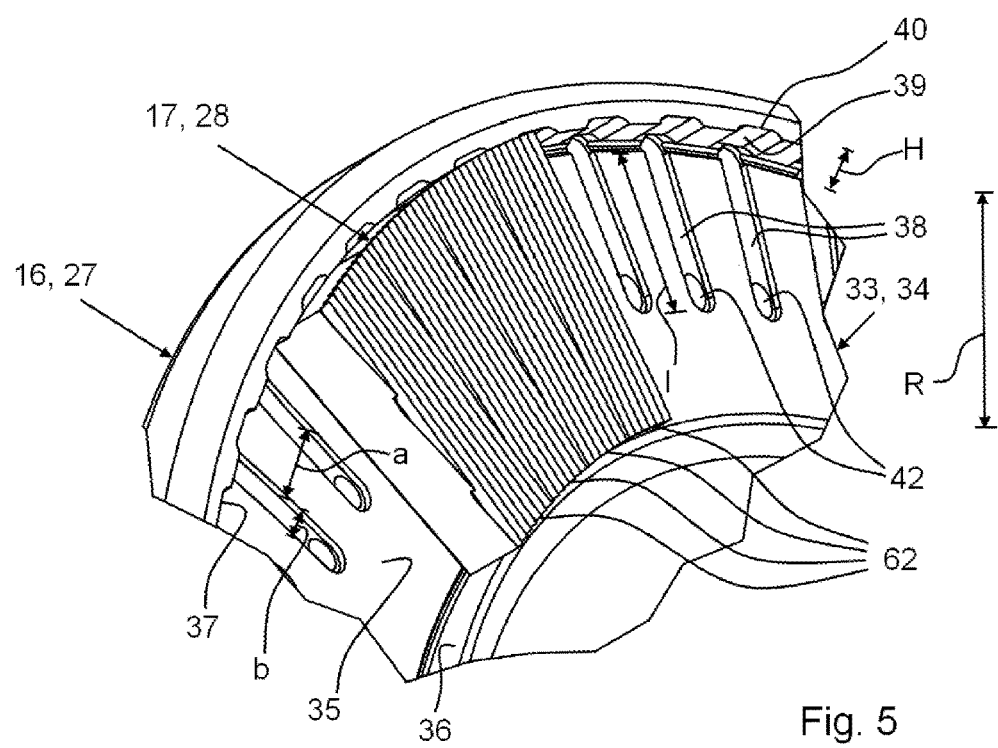
FIG. 5 is an oblique view of a partial area of a tool carrier according to the invention with comminuting tools arranged thereon.

For this purpose, the annular grooves 33, 34 in the tool carriers 16, 27, which form the seat for the comminuting tools 17, 28, are designed in a manner as can be seen from the combination of FIGS. 4 and 5. Due to the identical structure of the features essential to the invention, the illustration according to FIG. 5 applies to both the first tool carrier 16 and the second tool carrier 27.

The annular grooves 33, 34 are each defined by a groove base 35 lying in a vertical plane to the axis 2, a radially inner groove wall 36 standing vertically from the groove base 35, and a radially outer groove wall 37 standing vertically from the groove base 35. The inner groove wall 36 and outer groove wall 37 run coaxially to the axis 2. The axial depth of the annular grooves 33, 44 or axial height H of the groove walls 36, 37 is preferably in a range between 10 mm and 15 mm and in the present case is 13 mm. The width R of the annular grooves 33, 34 extending in the radial direction is preferably in a range between 60 mm and 100 mm and in the present case is 85 mm.

The first and second comminuting tools 17, 28 can be formed by tool rings or, as in the present exemplary embodiment, by a plurality of corrugated wedges 62 which are lined up without any gaps in the annular grooves 33, 34 to form a ring. In both cases, the comminuting tools 17, 28 rest with their planar rear sides flat on the groove bottom 35.

The groove base 35 has a number of groove-shaped recesses extending radially with respect to the axis 2 to form channels 38 arranged in a radial manner. The channels 38 extend starting from the outer groove wall 37 over at least half the radial width R of the groove base 35. Preferably, the radial length l of the channels 38 is between 50% to 70% of the length R of the annular grooves 33, 44. The radially inner end of the channels 38 is consequently situated in the half of the annular groove base 35 which is closer to the axis, whereby the channels 38 extend in the radial direction completely over the radially outer half of the annular groove base 35. This ensures that at least the outer circumferential area of the comminuting tools is efficiently cooled, in contrast to which the inner circumferential area can also be cooled less. The depth t of the channels 38 perpendicular to the groove base 35 is preferably in a range between 1.5 mm and 4 mm and in the present case is 2.5 mm.

The mutual mean distance between the channels 38 in the circumferential direction in terms of their central axis is denoted by a. Preferably, the mean distance a lies in a range between 30 mm and 50 mm and in the present case is 40 mm. The width b of the individual channels 38, which is also related to the circumferential direction, is at least 40% of the distance a and is preferably in a range between 60% and 70% of the distance a.

As an extension of the channels 38, the outer groove wall 37 in each case has an axially extending recess 39, which continues the channel 38 in the area of the outer groove wall 37 and forms an axially directed outlet opening 40 with its free end. The flow cross-section in the area of the recess 39 is as large or larger than the flow cross-section in the area of a channel 38. A through hole 41 traversing the tool carriers 16, 27, which comprises an inlet opening 42 to the channel 38, in each case opens into the opposite inner end of the channels 38. The through hole 41 extends to the rear side of the tool carriers 16, 27, wherein the borehole end there is offset radially outward with respect to the inlet opening 42 (FIG. 4).

In a non-illustrated embodiment of the invention, the free edge of the outer groove wall 37 springs back in the area of the outlet openings 40 to form axially oriented passages, so that the process gas 32 is fanned out into an axially-to-radially directed gas flow when it emerges.

As can be seen in particular from FIG. 4, the device for supplying the first comminuting tools 17 with process gas 32 comprises two openings 43 in the rear wall 5 of the housing 3, which are diametrically opposite on a circumferential circle about the axis 2. On the outside of the rear wall 5, in each case an inlet port 44 with a built-in regulating element, such as a flap 63, adjoins the openings 43, which can be pressurized with process gas 32 through a pipe system.

On the opposite inner side of the rear wall 5, an air guide disk 45 coaxially encircling the axis 2 is attached, the outside diameter of which is dimensioned such that the air guide disk 45 extends with its outer circumference radially beyond the openings 43, and the inside diameter of which is dimensioned such that the inner circumference of the air guide disk 45 overlaps radially with the rotor disk 13. On the side of the air guide disk 45 facing the rear wall 5 there is a circumferential first groove, the width of which extends in the radial direction from the openings 43 to the area of overlap with the rotor disk 22, and which together with the rear wall 5 forms a first annular channel 46. On the opposite side facing away from the rear wall 5, a circumferential second groove is provided. The second groove is significantly narrower than the first groove and is located in the radial direction in the area of overlap with the rotor disk 13, with which it forms a second annular channel 47. The first groove and the second groove and thus the first annular channel 46 and the second annular channel 47 are connected to each other in the axial direction via a plurality of through slots 52 extending arc-shaped around the axis 2 in the plane of the air guide disk 45.

For a gas-tight connection of the rotor disk 13 to the air guide disk 45, a dynamic seal is provided on the surfaces of the two disks 13, 45 facing each other in the area of overlap. For this purpose, the air guide disk 45 has a radially outer annular groove 48 and a radially inner annular groove 49 in relation to the second annular channel 47, and the rotor disk 13 has a radially outer annular web 50 and a radially inner annular web 51 on corresponding circumferential circles, each of which engage in the outer annular groove 48 or the inner annular groove 49 in the manner of a labyrinth seal.

The rotor disk 5 is penetrated in its outer circumferential area by a number of connecting bores 53, the ends of which, emerging on the inside of the rotor disk 5, are aligned in each case with the through bores 41 in the first tool carrier 16 and the opposite open end of which communicates with the second annular channel 47.

Process gas 32 arriving through the inlet port 44 is distributed uniformly in the first annular channel 46 formed by the first groove and the rear wall 5, from where it passes through the through slots 52 into the second annular channel 47 and there is distributed over the entire circumference. The second annular channel 47 simultaneously feeds all the connecting bores 53 with process gas 32, which enters the channels 38 via the through holes 41 and inlet openings 42, initially flows through these radially outwards and then axially, before it axially exits through the outlet openings 40 from the channels 38.

The second comminuting tools 28 are supplied in a corresponding manner, for which purpose the stator disk 22 has a third annular channel 54 on its outer side that coaxially encircles the axis 2 and into which two diametrically opposite inlet ports 55, which can be acted upon by process gas 32, open, and which have a built-in regulating element, such as a flap 64. The stator disk 22 also has a number of obliquely running connecting bores 56 which correspond to the connecting bores 53 on the rotor side and which are each aligned with through holes 41 in the second tool carrier 27.

Process gas 32 supplied to the inlet ports 55 is distributed evenly in the third annular channel 54, from where it simultaneously enters into all the connecting holes 56, and in addition, into the through holes 41. The process gas 32 flows through the channels 38 via the inlet openings 42, first in the radial and then in the axial direction, before it exits axially through the outlet openings 40.

In order to be able to charge a device 1 according to the invention with additional process gas 58, in particular cooling air, an upper inlet 59 arranged in the rear wall 5 of the housing 3 and a lower inlet 60 arranged in the rear wall 5 of the housing 3 can be seen in FIG. 2, both opening axially into the annular space 30. The upper inlet 59 lies above a horizontal dividing plane through the axis of rotation and the lower inlet 60 lies below the dividing plane. The two inlets 59 and 60 are preferably diametrically opposite the axis 2. The inlets 59 and 60 can also be arranged in the front wall 4 of the housing 3 or the housing casing 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for comminuting feed material, the device comprising:
    a housing;
    first comminuting tools; and
    second comminuting tools, the first and second comminuting tools being arranged within the housing and being axially spaced apart to form a comminuting zone, and of which at least the first comminuting tools execute a rotational movement about an axis of rotation,
    wherein the first comminuting tools are rigidly attached to a first tool carrier and the second comminuting tools are rigidly attached to a second tool carrier,
    wherein in a contact area between the first tool carrier and the first comminuting tools and/or in a contact area between the second tool carrier and the second comminuting tools, a plurality of channels for a passage of a process gas are provided, with a radially inner inlet opening through which the process gas enters the plurality of channels and a radially outer outlet opening through which the process gas emerges from the plurality of channels,
    wherein the plurality of channels extend radially.

2. The device according to claim 1, wherein a length of each of the plurality of channels corresponds to at least half a radial length of the first comminuting tools and/or the second comminuting tools.

3. The device according to claim 1, wherein the first tool carrier and/or the second tool carrier has an axially extending outer circumferential wall, which at least partially engages behind the first comminuting tools and/or the second comminuting tools along an outer circumference of the first comminuting tools and/or the second comminuting tools, the plurality of channels each continuing beyond the axially extending outer circumferential wall in the axial direction.

4. The device according to claim 1, wherein the first tool carrier and/or the second tool carrier comprises a number of through holes, wherein one end of each of the through holes open into one of the plurality of channels and another end of each of the through holes is configured to be charged with the process gas.

5. The device according to claim 1, wherein the plurality of channels are formed by recesses in at least one of the first tool carrier, the first comminuting tools, the second tool carrier, or the second comminuting tools.

6. The device according to claim 1, wherein the first tool carrier is fastened coaxially to a rotor disk, which rotates about the axis of rotation and has connecting bores, wherein in each case one of the connecting bores opens into a through hole in the first tool carrier on one side of the rotor disk and is configured to be charged with the process gas on the other side of the rotor disk.

7. The device according to claim 6, wherein the second tool carrier is fastened coaxially to a rigid stator disk that has connecting bores, wherein in each case one of the connecting bores opens into a through hole in the second tool carrier on one side of the stator disk and is configured to be charged with the process gas on the other side of the stator disk.

8. The device according to claim 7, wherein the plurality of channels are configured to be acted upon by the process gas directly or indirectly via annular channels.

9. The device according to claim 6, wherein the rotor disk adjoins the housing in a gas-tight manner via a dynamic seal or a labyrinth seal, and wherein an annular channel is arranged within the dynamic seal or the labyrinth seal.

10. The device according to claim 8, wherein one of the annular channels is arranged in the stator disk.

11. The device according to claim 8, wherein the annular channels are adapted to be acted upon by the process gas via a regulating element.

12. The device according to claim 7, wherein the rotor disk and the first tool carrier and/or the stator disk and the second tool carrier are formed in one piece.

13. The device according to claim 1, wherein the first comminuting tools and/or the second comminuting tools are formed by a plurality of annular segments, wherein each of the plurality of annular segments is assigned one of the plurality of channels.

14. The device according to claim 1, wherein the housing has at least one inlet for supplying additional process gas, which opens into an annular space formed between the housing and a rotor disk or a stator disk.

15. The device according to claim 1, wherein the radially inner inlet opening is positioned closer to the axis of rotation than the radially outer outlet opening.

* * * * *